United States Patent [19]

Theurer et al.

[11] Patent Number: 5,048,797
[45] Date of Patent: Sep. 17, 1991

[54] SELF-PROPELLED MACHINE AND METHOD FOR LAYING A CATENARY AND/OR A CONTACT WIRE OF AN OVERHEAD LINE

[75] Inventors: Josef Theurer, Vienna; Friedrich Oellerer, Linz; Leopold R. Gruber, Scheibbs, all of Austria

[73] Assignee: Franz Plasser Bahnbaumaschinen-Industriegesellschaft m.b.H., Vienna, Austria

[21] Appl. No.: 420,159

[22] Filed: Oct. 10, 1989

[30] Foreign Application Priority Data

Oct. 14, 1988 [EP] European Pat. Off. ............ 88890258

[51] Int. Cl.$^5$ .......................................... B65H 59/00
[52] U.S. Cl. ............................................. 254/134.3 R
[58] Field of Search ............... 254/134.3 R, 134.3 PA, 254/134.3 FT, 310, 321, 356, 378; 242/86.7, 86.5, 86.51, 54 R, 155 BW; 212/159

[56] References Cited

U.S. PATENT DOCUMENTS

| | | | |
|---|---|---|---|
| 3,244,292 | 4/1966 | Elliott | 254/134.3 FT |
| 4,213,596 | 7/1980 | Inoue et al. | 254/134.3 R |
| 4,728,079 | 3/1988 | Nitta et al. | 254/134.3 FT |

FOREIGN PATENT DOCUMENTS 526889  5/1929  Fed. Rep. of Germany .
2211247  3/1972  Fed. Rep. of Germany .

OTHER PUBLICATIONS

"Japanese Railway Engineering", pp. 23-25, vol. 9, 68 (Caternary Inspection Car . . . ).

Primary Examiner—Robert C. Watson
Attorney, Agent, or Firm—Collard, Roe & Galgano

[57] ABSTRACT

A self-propelled machine for continuously laying an overhead line extending above a track and attached to pylons spaced alongside the track, which comprises machine frame movable along the track in an operating direction, a power-driven, vertically and laterally adjustable work platform mounted on the machine frame for an operator assigned to attaching the overhead line to the pylons, a storage drum mounted on the machine frame, a length of the catenary and/or the contact wire of the overhead line being reeled on the storage drum and the drum being rotatable at a pay-out speed for unreeling the catenary and/or the contact wire, and a drive control for adjusting the moving speed of the machine frame in response to the pay-out speed of the catenary and/or the contact wire. A lifting device is mounted on the machine frame and includes a power-driven, vertically adjustable and laterally pivotal boom, and a support and guide pulley carried by the boom and arranged to support and guide the unreeled catenary and/or contact wire from the storage drum to the operator on the work platform at a constant height determined by the vertical adjustment of the boom and a lateral position determined by the pivoting of the boom, and a device is mounted on the machine frame between the storage drum and the pulley for continuously guiding and tensioning the catenary and/or contact wire, the guiding and tensioning device including a power-driven guide roller guiding the tensioned catenary and/or contact wire to the support and guide pulley, and a drive control for the guide roller.

26 Claims, 2 Drawing Sheets

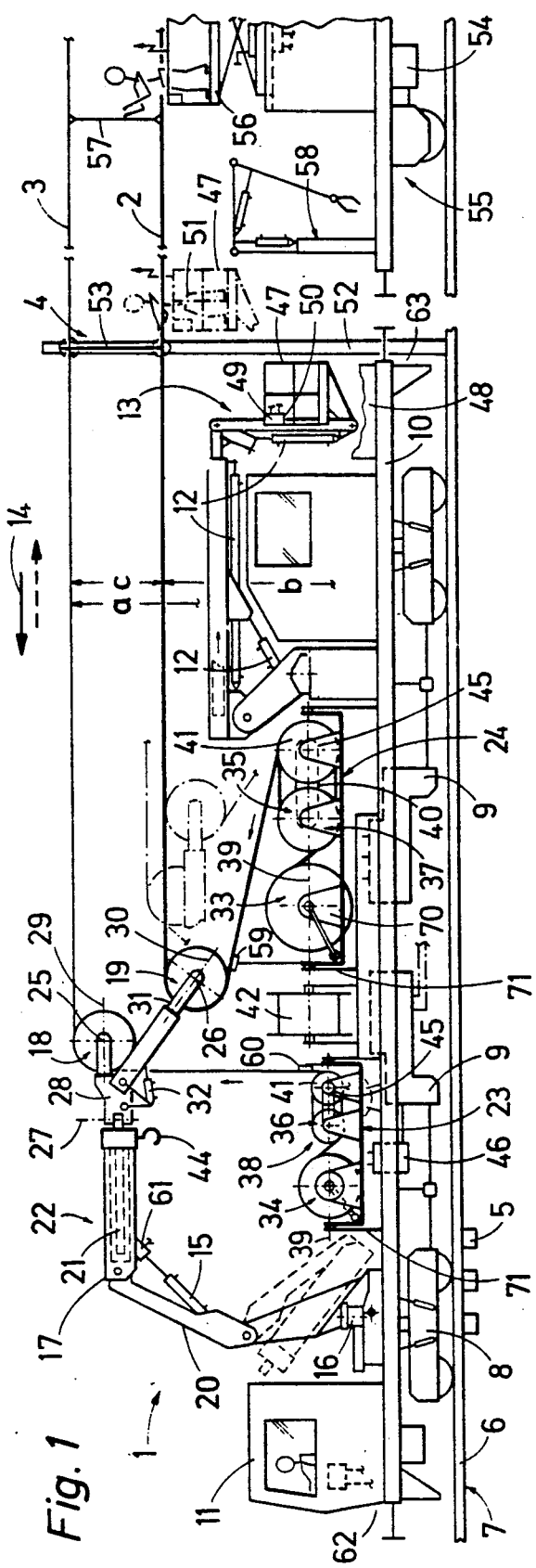
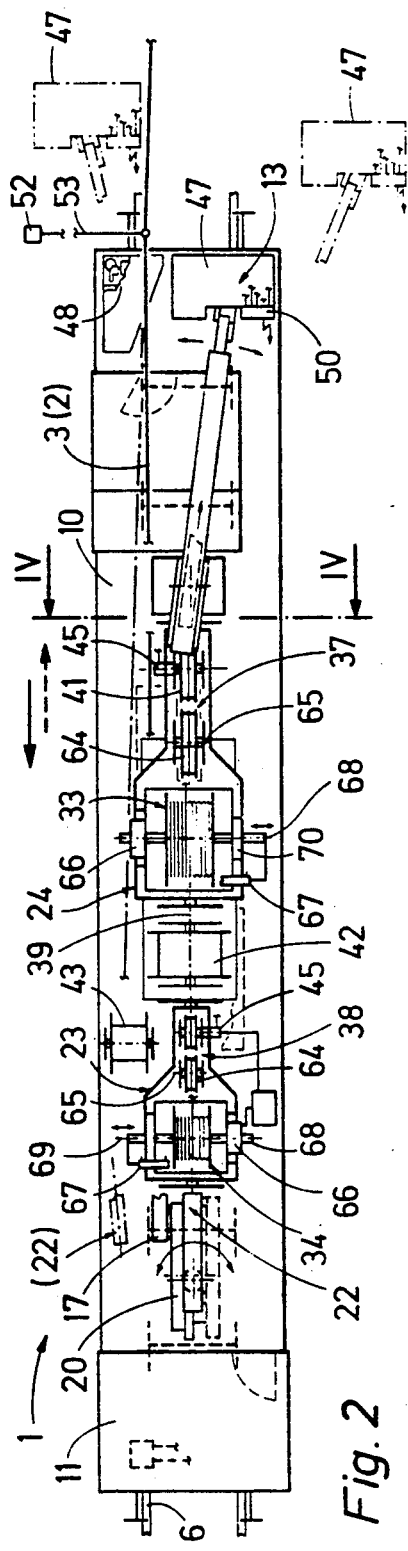
Fig. 1
Fig. 2

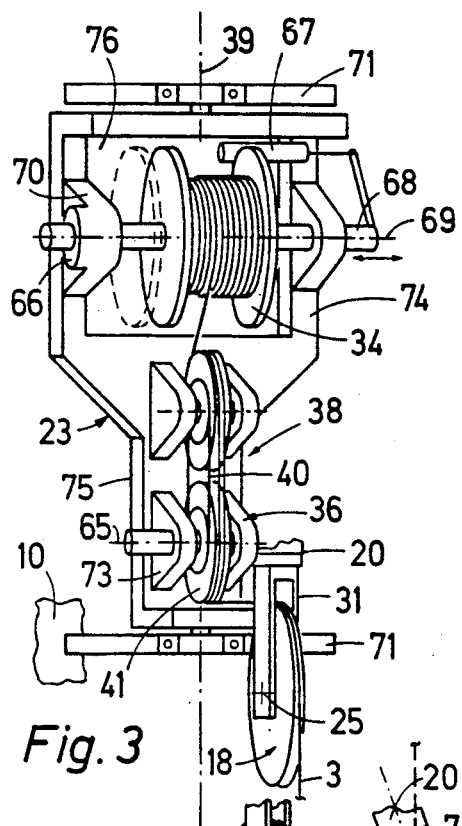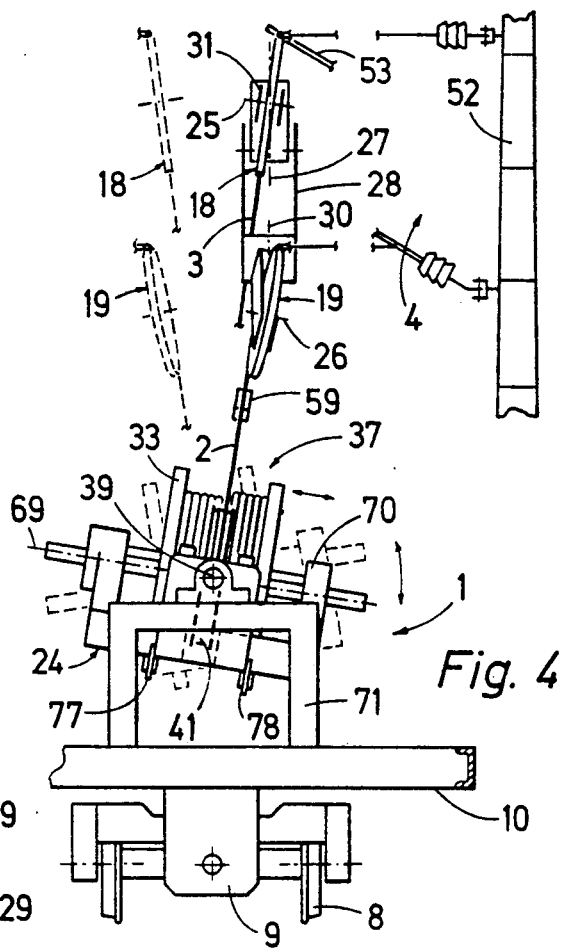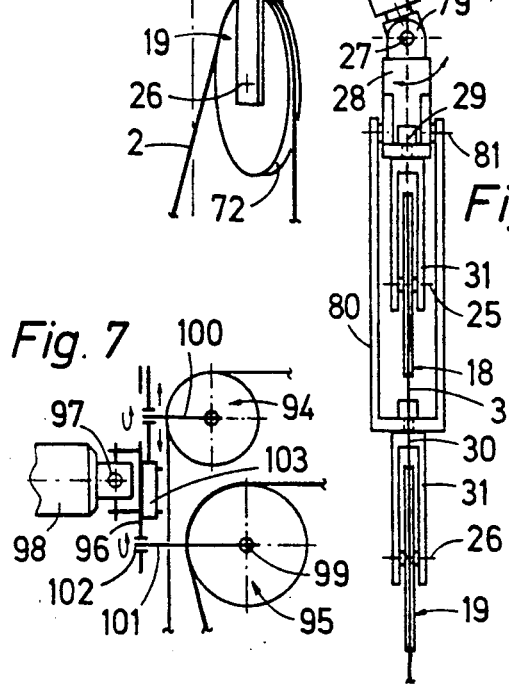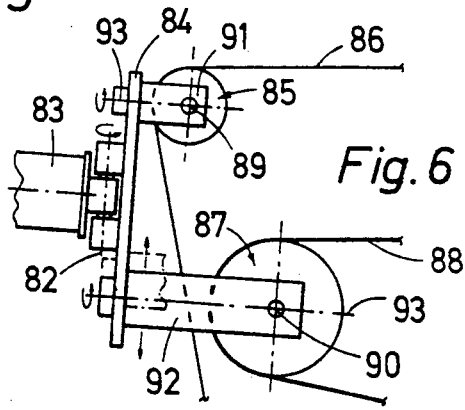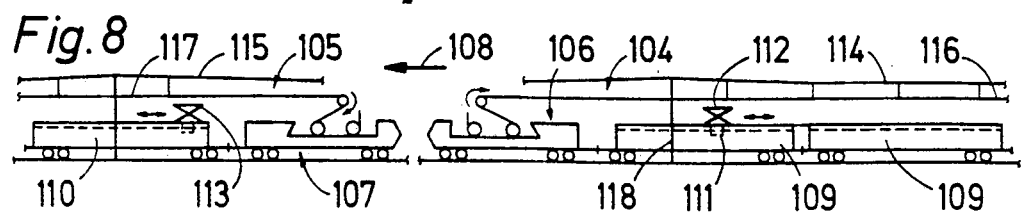

SELF-PROPELLED MACHINE AND METHOD FOR LAYING A CATENARY AND/OR A CONTACT WIRE OF AN OVERHEAD LINE

BACKGROUND OF THE INVENTION (1) Field of the Invention

The present invention relates to a self-propelled machine for laying a catenary and/or a contact wire of an overhead line extending above a track and attached to pylons spaced alongside the track, which comprises a machine frame having two opposite ends, undercarriages supporting the machine frame at the ends thereof for mobility on the track, a drive for moving the machine frame along the track in an operating direction, a driving operator's cab mounted on the machine frame, a power-driven, vertically adjustable work platform mounted on the machine frame for an operator assigned to attaching the overhead line to the pylons, a storage drum mounted on the machine frame, a length of the catenary and/or contact wire being reeled on the storage drum and the drum being rotatable at a pay-out speed for unreeling the catenary and/or contact wire, a drive control for adjusting the moving speed of the machine frame in response to the pay-out speed of the catenary and/or contact wire, a lifting device mounted on the machine frame, the lifting device including a power-driven, vertically adjustable and laterally pivotal boom and a support and guide pulley carried by the boom and arranged to support and guide the unreeled catenary and/or contact wire from the storage drum to the operator on the work platform, and a controllable device for tensioning the catenary and/or contact wire, which includes a guide roller.

(2) Description of the Prior Art

German patent No. 2,211,247, published Feb. 19, 1981, cites pages 214 to 226 of "Fahrleitungsnetz" by I. I. Wlassow, published in 1955 by Fachbuchverlag Leipzig, as state of the art. This publication discloses laying an overhead line comprised of a catenary and contact wire above a track by first affixing one end of the catenary and then guiding it over rollers mounted at spaced locations. For this purpose, use is made of a mobile car running on the track and carrying a rotatable storage drum for the catenary, and a brake is provided for the drum. After a section of the catenary has been laid, the catenary is tensioned or stretched by a tackle and the free end of the stretched catenary is permanently fixed in position. Subsequently, hangers are attached to the catenary and the contact wire is laid in the same manner and is suspended from the catenary by temporary hangers. The contact wire is then tensioned or stretched by one or more tackles and is fixed, whereupon it is attached to the permanent hangers. Laying an overhead line in this manner requires considerable work. Paying out or reeling the catenary and the contact wire on the storage drums is relatively difficult because they do not extend parallel to the track but in a zig-zag formation from one side of the track to the opposite side where the overhead line is affixed to spaced pylons at the track shoulders. It is, therefore, very time-consuming to obtain a proper pay-out of the catenary and the contact wire from the drum to its final position.

"Japanese Railway Engineering", Vol. 9, 1968, pages 23-25, discloses a catenary inspection and catenary stretching car for the inspection and simple repair of an overhead line. The car carries rotatable storage drums for the contact wire. When the contact wire is extended, the drum is braked by an oil pressure brake so that the contact wire ma be laid while tensioned. The car is not used for laying a new overhead line comprised of a catenary and a contact wire but only to replace a worn contact wire by a new contact wire on a catenary and hangers which are already in place. A rapid and accurate laying of the contact wire and/or the catenary is not possible with this car because of their zig-zag extension which is not parallel to the track.

German patent No. 526,889, published June 11, 1931, discloses a mobile car running on a track for laying an electrical overhead line above the track. Several wire storage drums are mounted on the car which also carries a lifting arm for raising the wires reeled off the drums to the level of hooks above the track, to which the wires are attached. This arrangement makes it possible to lay several wires simultaneously but these wires are not connected to each other. An accurate pay-out of the wires from the drum encounters the above-described difficulties because they wires do not extend parallel to the track.

The above-cited German patent No. 2,211,247 discloses a machine of the first-described type for the temporary installation of an overhead line. The self-propelled car of this machine carries the following structures: drums for storing the catenary cable and the contact wire and for paying them out under a controlled tension; a hook-sensing device; a tensioning device control with a drive for imparting a longitudinally extending tensioning force; a device for delivering the wire hangers; a suspension device operating in response to a sensing signal for suspending the catenary in the hooks; and an anchoring device for the other end of the catenary and/or the contact wire. A lifting arm, which is vertically adjustable by a power drive, is mounted between the drums and an upper portion of the contact wire and catenary and a carrier arm for two relatively small-diameter guide pulleys spaced from each other in the longitudinal extension of the machine frame lift and support the contact wire and the catenary, and a similarly small-diameter guide roller guides them over the tensioning device to the drums. This machine construction is of a relatively complex design and still is useful only for the temporary or provisional installation of the contact wire and catenary under tension. It, too, makes an accurate pay-out of the contact wire and the catenary from the drums as well as guidance over the tensioning device and guide rollers difficult, if not impossible, because in its final and permanent position, they extend in a zig-zag formation. Furthermore, the distance between the lifting device and the storage drums is relatively large in the longitudinal extension of the machine frame, which requires long connection wires for affixing the ends of the contact wire and/or catenary to the pylons. In particular, the machine requires an expensive and complex hook-sensing device as well as a device for delivering temporary hangers in connection with the wire-suspension device to make it possible at least approximately to guide the vertically and laterally adjustable carrier arm equipped with guide pulleys on the vertically adjustable work platform so that it can follow the alternating change in direction of the catenary and/or contact wire as it extends from pylon to pylon on the opposite track shoulders—and even this only provisionally. The suspension of the tensioned catenary is effected by the two spaced guide pulleys which are lifted with the carrier arm and the catenary section extending between the pulleys is suspended on the temporary hook therebetween. This provisional installation is very uneconomical and time-consuming, and the temporary hangers must be removed after the provisional installation in a subsequent operation to enable the permanent attachment elements to be mounted during a subsequent tensioning and orienting operation.

SUMMARY OF THE INVENTION

It is the primary object of this invention to provide an overhead line installation machine of the first-described type which is simple in structure and operation, and which enables the laying of the catenary cable and/or the contact wire of the overhead line to be effectuated more simply and under high tension thereof.

The above and other objects are accomplished according to one aspect of the invention with a self-propelled machine for continuously laying at least one of two elongated flexible elements of an overhead line extending above a track and attached to pylons spaced alongside the track, one of the two elongated flexible elements being a catenary cable and the other elongated flexible element being a contact wire, which comprises a machine frame having two opposite ends, undercarriages supporting the machine frame at the ends thereof for mobility on the track, a drive for moving the machine frame along the track in an operating direction, and a driving operator's cab mounted on the machine frame. A power-driven, vertically and laterally adjustable work platform for an operator assigned to attaching the overhead line to the pylons and a storage drum are mounted on the machine frame, a length of the elongated flexible element being reeled on the storage drum and the drum being rotatable at a pay-out speed for unreeling the elongated flexible element. The machine further comprises a drive control for adjusting the moving speed of the machine frame in response to the pay-out speed of the elongated flexible element, a lifting device mounted on the machine frame, the lifting device including a power-driven, vertically adjustable and laterally pivotal boom and a support and guide pulley carried by the boom and arranged to support and guide the unreeled elongated flexible element from the storage drum to the operator on the work platform at a constant height determined by the vertical adjustment of the boom and a lateral position determined by the pivoting of the boom, and a device mounted on the machine frame between the storage drum and the pulley for continuously guiding and tensioning the elongated flexible element, the guiding and tensioning device including a power-driven guide roller guiding the tensioned elongated flexible element to the support and guide pulley, and a drive control for the guide roller.

A machine of this structure is simple to build and operate, and it makes it possible to lay or replace overhead line catenaries and/or contact wires simply, accurately and rapidly in a desired position. It is not necessary for the operating personnel to effectuate difficult and time-consuming centering, retaining and adjusting steps with respect to the catenary and/or contact wire because they are laid on the fastening elements at the pylons in their desired, tensioned position, in which they are then fixed to the pylons.

More particularly, the machine of the invention makes it possible for the first time to fasten the catenary and the contact wire permanently to the steady braces on the pylons and to attach the hangers to the catenary and contact wire in a single operating stage as the catenary and contact wire are simultaneously reeled off their storage drums Thus, the machine produces a finished, stretched and installed overhead line without requiring any subsequent operations and the use of additional machines The construction of the support and guide pulleys and of the tensioning device with its guide roller assures a continuous support and stretching of the catenary and/or the contact wire so that they will be continuously maintained under their required tension as they are reeled off the storage drums The continuous support of the catenary and/or contact wire at their desired elevations enables them to be centered along their zig-zag path from side-to-side of the track simply and without problems, and without requiring complicated and time-consuming operations, by simply laterally pivoting the support and guide pulleys while maintaining the adjusted height unchanged at the desired elevation. For all these reasons, the machine is very economical and may be used in the same advantageous manner for detaching an overhead line to be replaced According to another aspect of the invention, there is provided an apparatus for continuously reconstructing such an overhead line, which comprises two like self-propelled machines of the above-described type for respectively continuously laying and receiving the overhead line, and a work car coupled to each self-propelled machine, each work car comprising a power-driven, vertically adjustable and longitudinally displaceable work platform.

Such an apparatus makes it possible completely to dismount an old overhead line and to install a new overhead line with relatively little personnel in a single operation. The vertically adjustable and longitudinally displaceable work platforms on the work cars allow the operators sufficient time for the dismounting and affixing work while the machines continuously advance along the track, and other necessary reconstruction work is done.

According to yet another aspect, the invention provides a method for continuously laying an overhead line, which comprises the steps of propelling a machine carrying respective storage drums for the catenary cable and the contact wire along the track, unreeling the catenary cable and the contact wire from respective storage drums while the machine is propelled along the track, subjecting the unreeled catenary cable and contact wire to a controlled tension force while they are wound about a guiding and tensioning device mounted on the machine, supporting and guiding the unreeled, tensioned catenary cable and contact wire by respective support and guide pulleys vertically and laterally adjustably mounted on the machine, vertically and laterally adjusting the pulleys to maintain the tensioned catenary cable and contact wire at a corresponding vertical and lateral position adjacent a respective one of the pylons at one side of the track, attaching the overhead line to the respective pylon whereby the catenary cable and the contact wire are fixed in said position, subsequently laterally adjusting the support and guide pulleys to position them adjacent a succeeding one of the pylons at the opposite side of the track while maintaining the supporting and guide pulleys at a constant vertical adjustment and propelling the machine along the track whereby the overhead line assumes a zig-zag path between succeeding pylons and the catenary cable and contact wire are centered along said path, and affixing hangers between the catenary cable and the contact wire of the attached overhead line in a trailing operation immediately following the attachment operation to maintain the catenary cable and the contact wire at the desired vertical position This succession of steps for the first time makes it possible in a single simple and economical operation to lay an overhead line and fix it in its desired position Beginning with the unreeling of the catenary and the contact wire to the final affixing thereof to the steady braces and to the hangers, respectively, the operation proceeds without interruption in the manner of a moving assembly line, the operational steps being coordinated in a highly efficiently manner. Since the catenary and the contact wire are unreeled under their respective required tensions, which often differ considerably from each other, at their respective desired levels, a simple, rapid and final affixing of the overhead line components is possible.

DETAILED DESCRIPTION OF THE DRAWING

The above objects, advantages and features of the present invention will become more apparent from the following detailed description of certain now preferred embodiments thereof, taken in conjunction with the accompanying, generally schematic drawing wherein FIG. 1 is a side elevational view of a machine for installing or dismounting the catenary and/or the contact wire of an overhead line in an installing position immediately following a pylon, which comprises a boom car followed by a tower car;

FIG. 2 is a top view of the machine but, for a better understanding, the storage drums for the catenary and contact wire are shown in an intermediate position and the support and guide pulleys illustrated in FIG. 5 are not shown;

FIG. 3 is an enlarged perspective top view of one of two tensioning devices in its laying position, the tensioning device being constituted by a winch, and of the two support and guide pulleys supported on a lifting device;

FIG. 4 is an enlarged end view of the machine, as seen in the direction of arrows IV—IV of FIG. 2;

FIG. 5 is an enlarged top view of the two support and guide pulleys in the intermediate position shown in FIG. 2;

FIG. 6 shows an embodiment of support and guide pulleys supported on a lifting device for guiding the catenary and the contact wire to the desired level;

FIG. 7 diagrammatically illustrates another embodiment of support and guide pulleys adjustable in relation to each other by a power drive and supported on a lifting device constituted by a pivotal crane; and FIG. 8 is a diagrammatic side view of two machines constructed according to the invention and operated in tandem for dismounting an old overhead line and installing a new overhead line.

DETAILED DESCRIPTION OF PREFERRED EMBODIMENTS

FIGS. 1 and 2 show self-propelled machine 1 for continuously laying or receiving at least one of two elongated flexible elements of overhead line 4 extending above track 7 and attached to pylons 52 spaced alongside the track, one of the two elongated flexible elements being catenary cable 3 and the other elongated flexible element being contact wire 2. The track is comprised of rails 6 fastened to ties 5. The machine comprises machine frame 10 having two opposite ends and undercarriages 8 support the machine frame at the ends thereof for mobility on the track. Drive 9 moves machine frame 10 along track 7 in an operating direction indicated by arrow 14, and driving operator's cab 11 is mounted on the machine frame. Drive 9 has sufficient power to pull about 10 to 12 tons and can move the machine frame up an incline of up to 30 pro mil. If only a single machine moving drive 9 is provided, as illustrated at the left in FIG. 1, it is connected by the dash-dot lines to the other drives, particularly the drives for the tensioning winches. Power-driven, vertically and laterally adjustable work platform 13 is mounted on the machine frame for an operator assigned to attaching the overhead line to pylons, hydraulic drives 12 enabling the work platform to be adjusted to the desired height and lateral position. Respective storage drum 33, 34 is mounted on machine frame 10 and a length of the elongated flexible element 3, 2 is reeled on the respective storage drum which is rotatable at a pay-out speed for unreeling the elongated flexible element. Drive 9 is controlled for adjusting the moving speed of the machine frame in response to the pay-out speed of the elongated flexible element. Lifting device 20 is also mounted on machine frame 10 and includes power-driven, vertically adjustable and laterally pivotal boom 17, and a respective support and guide pulley 18, 19 carried by boom 17 and arranged to support and guide the unreeled elongated flexible element 3, 2, respectively, from respective storage drum 34, 33 to the operator on work platform 13 at a constant height determined by the vertical adjustment of boom 17 and a lateral position determined by the pivoting of the boom. Illustrated lifting device 20 is a pivotal crane 22, boom 17 being a telescopingly arranged arm extending in the direction of the longitudinal extension of machine frame 10, and further comprises power drive 15 linking the boom to the crane for vertically adjusting the boom, power drive 16 for laterally adjusting the crane and power drive 21 for telescopingly adjusting the boom arm to an extension of about 10 m, the crane being mounted on machine frame 10 ahead of storage drums 34, 33 in the operating direction. The power drives enable support and guide pulleys 18, 19 on boom 17 to be adjustably positioned above a space centered between the two storage drums. This simple crane arrangement enables the support and guide pulleys to be placed rapidly and without problems into their most favorable operating positions along the machine frame and permits them to be swung back and forth laterally to obtain the desired zig-zag path of the overhead line, the cantilevered construction of the pivotal crane dependably excluding any possible interference with the unreeling of the catenary and the contact wire from their storage drums.

The illustrated machine further comprises respective device 37, 38 mounted on machine frame 10 between respective storage drum 33, 34 and respective pulley 19, 18 for continuously guiding and tensioning contact wire 2 and catenary 4, respectively, each guiding and tensioning device including, respectively, power-driven guide roller 41 guiding the tensioned contact wire and catenary, respectively to support and guide pulleys 19, 18, and drive control 45 for each guide roller.

Support and guide pulleys 18, 19 and guide rollers 41 are arranged for guiding the catenary and the contact wire along a path extending substantially perpendicularly to rotary axes 25, 26 of the pulleys and of the rollers independently of the lateral position of boom 17. The support and guide pulleys are also power-driven and they are supported on carrier member 28 rotatably for pivoting about vertical axis 27 whereby the catenary and contact wire are automatically centered and oriented in a longitudinal direction when the overhead line extends in a lateral zig-zag path between successive pylons 52 at respective sides of the track. The support and guide pulleys are universally pivotal by mounting them on respective holders 31 on an outer end of carrier member 28 remote from vertical pivoting axis 27, each holder being rotatable about respective axis 29, 30 extending perpendicularly to vertical axis 27 substantially parallel to the longitudinal direction. The pivotal carrier member for the support and guide pulleys provides an automatic centering means for the catenary and contact wire while providing a solid connection to boom 17, which can withstand very high tensile force. The pivoting of the carrier member will automatically adjust the pulleys along the zig-zag path of the overhead line while the vertically adjusted boom will hold them at the desired level. The universal pivoting arrangement will continuously hold the catenary and contact wire in the circumferential grooves of the pulleys, regardless of the lateral position of the boom, so that they will securely be retained in the pulley grooves during the entire operation.

The vertical and lateral adjustment by power drives 15 and 16 enables support and guide pulleys 18, 19 to be brought into their desired vertical and lateral position where they hold the catenary and contact wire, the pivoting of carrier member 28 about vertical axis 27 dependably centering the overhead line along the zig-zag path.

Each guide roller 41 is positioned below the associated support and guide pulley 18, 19 and is mounted on machine frame 10 for tilting about axis 39 extending in the longitudinal extension of machine frame 10 and perpendicularly to the rotary axis of the roller. This relative positioning of the guide rollers and their associated pulleys provides a particularly compact arrangement enabling the machine frame to be relatively short while the tilting of the rollers enables the unreeling catenary and contact wire to adapt their paths to the lateral position of the support and guide pulleys.

The storage drums are capable of carrying about 900 to 1600 meters of catenary cable and contact wire, respectively, reeled on the drums, having an approximate weight of two to three tons and a cross sectional area of about 70 and 110 mm$^2$, respectively. The support and guide pulleys as well as the guide rollers have circumferential grooves accommodating the catenary and contact wire, and each pulley and associated roller are so positioned relative to each other that the catenary and contact wire will be deflected by at least 90° as it is guided from the roller to the pulley. The contact wire is relatively stiff, and pulley 19 and roller 41 have substantially the same diameter which is preferably at least about one meter, depending on the wire gauge. This arrangement and coordination of the support and guide pulley with the guide roller of the tensioning device provides an accurate and secure guide of the catenary and the contact wire without subjecting the same to undue flexing forces so that such relatively stiff flexible elongated elements will be unreeled, tensioned and deflected without problems.

Each device 37, 38 for continuously guiding and tensioning elongated flexible element 2, 3 further comprises another guide roller 64, 65, respectively connected with power-driven guide roller 41 for rotation in tandem therewith by means of chain drive 40. The guide rollers are rotatable by power drives 45 about transverse axes 65 extending parallel to each other and are tiltable about axis 39 which extends perpendicularly to the rotary axes of the rollers Drives 45 are each connected to central hydraulic fluid pump 46 supplying power to the drives. The tandem guide rollers form winches 35, 36 about which the respective elongated flexible element may be wound several times for obtaining a desired and measurable tensioning rotary moment. The guide rollers of each winch have the same diameter but the roller diameters of winch 35 for tensioning contact wire 2 are smaller than those of winch 36 for tensioning the catenary. Respective tension monitoring device 59, 60 is arranged between winch 35, 36 and support and guide pulley 19, 18 in contact with contact wire 2 and catenary 3, respectively, for measurably determining and maintaining a selected constant tension thereof, and the tension monitoring devices are connected to central control 50 and to drive controls 45 for the guide rollers of the winches as well as machine drive 9. The tension monitoring devices preferably have odometers incorporated therein. The preferred tension of the contact wire and of the catenary is about 1000 and 700 kg, respectively. The arrangement of the tension monitoring devices enables a substantially constant tension of the contact wire and the catenary to be maintained independently of the forward speed of machine 1 so that the unreeled contact wire and catenary supported and guided by pulleys 19 and 18 may be immediately fastened to the pylons. Since the tension monitoring devices are mounted between winches 35, 36 and pulleys 19, 18, the pulleys may be laterally adjusted along the zig-zag path of the overhead line without interfering with these devices. Winches are structurally relatively simple and robust guiding and tensioning devices for braking the unreeled elongated flexible elements forcefully to impart a uniform and high tension thereto. Since the tandem guide rollers tilt about axis 39, the flexible elongated element will be wound about the winch without any problems, regardless of its tilted position.

In the illustrated embodiment, a respective common cradle 23, 24 supports each storage drum 34, 33 and the tensioning winch 38, 37, the cradles being mounted on machine frame 10 for tilting or rocking about axis 39. As shown in FIG. 3, each storage drum is mounted on bearing 70 of its cradle for rotation about rotary axis 69. Power drive 66 rotates the storage drum which is arranged on bearing 70 for transverse displacement parallel to rotary axes 65 of guide rollers 64, 65, 41 by power drive 67. In this manner, the storage drums and tensioning winches are titled in unison and tilting of the cradles changes the inclination of the drums and the axes of the guide rollers to adapt the paths of the catenary and contact wire to the changing lateral positions of support and guide pulleys 18, 19. The transverse displacement of the storage drums in combination with their tilting assures an accurate unreeling. It assures that the elongated flexible element coming from the tensioning winch will always arrive at the storage drum at the same point and perpendicularly to the rotary axis of the support and guide pulley, which produces a uniform and troublefree operation of the winch. Rotary drive 66 assures a troublefree reeling of the elongated flexible element when the machine is used for dismounting an overhead line.

Work platform 13 has been shown in full lines in FIGS. 1 and 2 in its position during transit of machine 1 while one operating position thereof has been shown in phantom lines in FIG. 1 and two of many possible lateral operating positions have been indicated in phantom lines in FIG. 2. Rotary axes 25, 26 of support and guide pulleys 18, 19, rotary axes 65 of the guide rollers of winches 35, 36 and rotary axes 69 of storage drums 33, 34 have been shown in their horizontal (center) positions, for the sake of simplicity of illustration. The rotary axes are in this horizontal position when pulleys 18, 19 are exactly above the center line of the track as they move laterally from side to side when they lay the overhead line in its zig-zag path, or during transit when the machine is not in operation. When the contact wire and catenary support and guide pulleys are laterally moved according to the required zig-zag path of overhead line 4, with a maximum distance of about 40 cm from the track center line, the rotary axes will be somewhat inclined to the horizontal, as will be explained in more detail hereinafter in connection with FIGS. 3 and 4. FIG. 1 also shows the storage drums, guide rollers and support and guide pulleys in their vertical positions although they will be slightly inclined (see FIG. 3) when they are laterally spaced from the track center line during the installation or dismounting of the overhead line.

While the machine could be used with a single storage drum and associated tensioning device and support and guide pulley for laying and/or receiving only the catenary or the contact wire of an overhead line, the hereinabove described and illustrated arrangement has the advantage of enabling the catenary and the contact wire to be installed or dismounted at the same time without interference with each other. Thus, the machine can be used for simultaneously unreeling the contact wire and the catenary, and in the same operating stage to fix them to the pylons, providing a very productive and economical operation for the installation as well as the dismounting of an entire overhead line or of one of its flexible elongated elements. Pulleys 18, 19 will support and guide the catenary cable and the contact wire from respective storage drums 34, 33 to the operator on work platform 13 at respective constant heights a of catenary 3 and b of contact wire 2, these heights being respectively determined by the vertical adjustment of boom 17 and the vertical distance of pulleys 18, 19 from each other as well as the lateral position determined by pivoting the boom by power drive 16.

It is advantageous to mount support and guide pulleys 18, 19 for relative vertical adjustment in relation to each other so that distance c between contact wire 2 and catenary 3 may be adjusted, and in the preferred embodiment illustrated herein, power drive 32 links holder 31 of pulley 19 by means of a linkage system to carrier member 28. As shown, contact wire support and guide pulley 19 trails catenary cable support and guide pulley 18 in the operating direction, which enables the laying of the contact wire and the catenary to proceed without interference with each other and the level of the contact wire may be changed by operation of drive 32 without interference by preceding pulley 19 for the catenary.

As best shown in FIG. 2, reserve storage drums 42 and 43 for the catenary cable and for the contact wire, respectively, are mounted on machine frame 10 between cradles 23 and 24. They can be transported on hook 44 on boom 17 of pivotal crane 20.

In the preferred embodiment illustrated herein, driving operator's cab 11 is mounted on machine frame 10 at leading end 62 of the machine frame in the operating direction, lifting device 20 is mounted on the machine frame immediately behind cab 11 in the operating direction and work platform 13 is mounted on the machine frame at the opposite, trailing machine frame end 63, which has material storage space 48 adjacent the work platform. The work platform carries fenced-in operator's station 47 which houses central control 50 including digital indicator instrument 49 for indicating the tension of the unreeled elongated flexible element 2, 3. Central control 50 is connected to power drives 9, 15, 16 and 45 for respective remote control of the machine moving speed, the vertical and lateral adjustment of lifting device 20 and the rotation of the guide rollers of winches 37, 38. The lifting device comprises vertical measuring and indicating instrument 61. Arranging the lifting device and the work platform at opposite ends of the machine frame enables an operator on the platform to observe the positioning of support and guide pulleys 18, 19 without interference, and monitoring the vertical adjustment of lifting device 20 makes it possible to adjust the level of the pulleys accurately at all times by remote control. The central control of the power drives enables the operator at station 47, who has an excellent view of the entire operation, to control the zig-zag path of the overhead line according to the prevailing conditions. Digital tension indicator 49 enables the operator to change the tension immediately if a deviation from the desired tension is registered.

FIGS. 1 and 2 show respective operating positions of operator's station 47 in phantom lines, operator 51 at the station operating central control 50 and attending to the attachment of catenary 3 and contact wire 2 to steady brace 53 affixed to pylon 52. In the illustrated embodiment, machine 1 is combined with a trailing, self-propelled tower car 55 equipped with drive 54 and carrying vertically adjustable work tower 56 for an operator assigned to detach and attach hangers 57 connecting contact wire 2 to catenary 3 and steady braces 53 attaching the overhead line to the pylons. Vertically and laterally adjustable crane 58 is mounted on a leading machine frame end of the tower car for transporting the parts, i.e. hangers 57, to the work tower. This combination has the advantage that the final mounting of the overhead line may be effected in the same operating stage with the laying of the tensioned catenary and contact wire in their desired positions.

Referring now to FIG. 3, support and guide pulleys 18, 19 are shown in their lateral positions, with their rotary axes 25, 26 slightly inclined with respect to the horizontal, these pulley positions being produced by laterally pivoting crane 22. Rotary axes 65 of the guide rollers of tensioning winch 36 (and of winch 35 not shown in this figure) as well as rotary axis 69 of storage drum 34 for the catenary (and of contact wire drum 33 not shown) are similarly inclined. Each pulley has circumferential groove 72 holding the respective elongated flexible element 2. Guide rollers 41, 64 of winch 36 are mounted on bearings 73 for rotation about axes 65. Cradle 23 comprises first frame part 74 defining opening 76 accommodating storage drum 34 and adjoining frame part 75 whereon guiding and tensioning device 36 is mounted. Cradle 24 mounting storage drum 33 and winch 35 is similarly constructed but is somewhat larger and stronger, the two cradles being mounted on machine frame 10 in succession in the longitudinal extension thereof, as shown in FIGS. 1 and 2. Opening 76 is wide enough to permit the transverse displacement of the storage drum by power drive 67 between the positions shown respectively in full and broken lines in FIG. 3. This cradle structure enables the storage drum to be carried relatively low in opening 76 of frame part 74 so that rotary axes 65 of the winch and rotary axis 69 of storage drum extend in a common horizontal plane defined by tilting axis 39. This facilitates the tilting of the cradle. The successive arrangement of the two cradles enables the storage drums to be handled readily for rapid exchange of an empty drum for a reserve drum by pivotal crane 22.

FIG. 4 shows rocking cradle 24 with contact wire storage drum 33 and guide roller 41 of winch 35, the drum and roller axes being slightly laterally inclined because of the inclination of support and guide pulleys 18, 19. The opposite position of the pulleys and of the storage drum and winch resulting from the zig-zag path of overhead line 4 is shown in broken lines. The rocking of the cradles about axis 39 is limited by shock-absorbing abutments 77, 78 at both sides of each cradle. The abutments are mounted on the cradle and are arranged to contact respective sides of bearing block 71 mounted on machine frame 10.

In FIG. 5, support and guide pulleys 18, 19 are shown extending in a common vertical plane, with their rotary axes 25, 26 extending perpendicularly to vertical pivoting axis 27 of joint 79 connecting carrier member 28 of the pulleys to boom 17 of lifting device 20. Holder 31 for catenary support and guide pulley 18 is affixed directly to carrier member 28 while contact wire support and guide pulley holder 31 is mounted on carrier 80 for pivoting about axis 30. Carrier 80 is mounted on carrier member 28 for pivoting about horizontal axis 81 extending perpendicularly to vertical pivoting axis 27 and can be pivoted by drive 32 (see FIG. 1) for changing the level of pulley 19 with respect to pulley 18.

In the embodiment illustrated in FIG. 6, carrier member 84 for pulley 85 supporting and guiding catenary 86 and pulley 87 supporting and guiding contact wire 88 is mounted on laterally pivotal and vertically adjustable crane 83 for pivoting about vertical axis 82, the diameter of the contact wire pulley being larger than that of the catenary pulley. Each support and guide pulley 85, 87 is rotatable about respective axis 89, 90 on respective pulley holder 91, 92. Each pulley holder is mounted on carrier member 84 rotatably about axis 93 extending perpendicularly to rotary axes 89, 90 of the pulleys. In addition, as indicated by small arrows and phantom lines, lower pulley holder 92 may be displaceable in a direction extending parallel to pivoting axis 82 of the carrier member so that the distance between catenary 86 and contact wire 88 may be selectively changed during installation or dismounting of the overhead line.

The embodiment of FIG. 7 has carrier member 96 for support and guide pulleys 94 and 96 for the catenary and the contact wire, cardan joint 97 linking the carrier member to boom 98 of a laterally pivotal and vertically adjustable crane. Each pulley is mounted on respective holder 100 and 101 for rotation about axis 99, and the pulley holders are mounted on carrier member 96 for rotation about pivoting axes 102 extending perpendicularly to rotary axes 99 of the pulleys. As shown by small arrows, upper pulley holder 100 is vertically displaceably mounted on the carrier member and may be displaced by power drive 103 during operation to change the distance between the catenary and the contact wire.

The operation of machine 1 illustrated in FIGS. 1 to 5 will now be described in detail, the machine being used for continuously laying overhead line 4 comprised of two elongated flexible elements extending above track 7, one of the elongated flexible elements being catenary cable 3 and the other elongated flexible element being contact wire 2:

Before the installation of the overhead line is begun, the free ends of contact wire 2 and catenary 3 are pulled from their storage drums 33 and 34 to start unreeling them, and the unreeled contact wire and catenary are wound twice about guide rollers 41, 64 of winches 35, 36, then passed through tension monitoring instruments 59, 60 in contact therewith, and led into circumferential guide grooves 72 of support and guide pulleys 19 and 18. The free contact wire and catenary ends are then provisionally attached to a pylon 52 at the beginning of a track section of, for example, 1200 meter. Drives 15 and 21 of pivotal crane 22 constituting lifting device 20 of the machine are then actuated to position support and guide pulleys 18, 19 on boom 17 so that catenary 3 and contact wire 2 will assume desired levels a and b between the pulleys, which have been located between the winches, and the pylon to which the overhead line has been provisionally attached. Drive 32 is then actuated for vertical adjustment of support and guide pulley 19 to obtain desired distance c between the catenary and the contact wire. Meanwhile, operator 51 has taken his place in operator's station 47 on work platform 13 and the operator actuates drives 12 from control panel 50 to move the work platform into the elevated position indicated in phantom lines in FIG. 1. Another operator has taken his place on work platform 56 on tower car 55. The machine is now ready for operation.

At the start, operator 51 at central control 50 actuates drive 9 to propel the machine along the track with a pulling force of up to, for example, 12 tons and actuates drive 45 of guiding and tensioning devices 37, 38, i.e. winches 35, 36, until catenary 3 and contact wire 2, whose tension must considerably exceed that of the catenary, are sufficiently tensioned, the desired tension of the catenary being, for example, 700 kg while that of the contact wire is 1000 kg. The respective tension forces are measured by electronic monitoring instruments 59, 60 and are displayed to operator 51 by digital tension force indicator 49 for remote control of the drives by the operator. As soon as the desired tension of the catenary and the contact wire has been obtained while machine 1 continuously advances slowly along the track in the operating direction indicated by arrow 14, rotary drive 66 and transverse displacement drive 67 of storage drums 33 and 34 are actuated while rotary drives 45 operate the winches to unreel the catenary cable and the contact wire from the respective storage drums while the machine is propelled along the track and the unreeled catenary cable and contact wire are subjected to a controlled tension force while being wound about the winches. The tension force is controlled continuously and automatically by tension monitoring instruments 59, 60 which so control rotary drives 45 of the winches that the desired tension of the catenary and contact wire are maintained constant as the machine advances continuously. The unreeled, tensioned catenary cable and contact wire are supported and guided by support and guide pulleys 18 and 19, respectively, and the pulleys are vertically and laterally adjusted to maintain the tensioned catenary and contact wire at a corresponding vertical and lateral position adjacent a respective pylon 52 at one side of the track where the overhead line is fixed in this position. To obtain the lateral deflection of overhead line 4 along a zig-zag path between succeeding pylons 52 along track 7 at opposite sides thereof, operator 51 actuates pivoting drive 16 of lifting device 20 so that support and guide pulleys 18, 19 to guide and position them along this path adjacent a succeeding pylon at the opposite track side (see FIGS. 3 and 4) while maintaining the pulleys at a constant vertical adjustment as the machine is propelled along the track whereby overhead line 4 assumes the desired zig-zag path between the succeeding pylons. The catenary cable and the contact wire are centered along this path because the lateral pivoting of crane 22 by drive 16 causes support and guide pulleys 18, 19 to be rotated about their axes 29, 30 while the catenary and the contact wire are maintained under the required tension and are firmly guided in circumferential pulley grooves 72, and the pulleys on carrier member 28 are automatically pivoted on boom 17 about vertical axis 27 in the direction of the zig-zag path of the tensioned catenary and contact wire (see the phantom line showings of pivotal crane 22 and of catenary 3 and contact wire 2 before attachment to steady brace 53 in FIG. 2).

When operator 51 has reached a steady brace 53 projecting from a pylon 52 after the support and guide pulleys on the machine frame have passed this pylon, the tensioned catenary is permanently affixed by the operator to the steady brace. The connection of the catenary to the steady brace may be effected while machine 1 continues to advance slowly or while it is briefly stopped. If it is done while the machine moves, operator's station 47 is longitudinally displaced b extending the telescoping carrier boom of work platform 13 at the same speed as the machine speed but in the opposite direction so that the operator's station will stand still while the operator attaches the catenary to the steady brace. If the machine is stopped during this operation, rotary drives 45 of winches 35, 36 and drives 66 and 67 of storage drums 33, 34 are also temporarily stopped. After the catenary has been permanently affixed to the pylon, machine 1 is propelled again and the above-described operation is resumed, with all drives actuated and pivoting drive 16 of crane 22 causing the tensioned catenary and contact wire supported and guided on pulleys 18, 19 to be swung laterally towards a succeeding pylon at the opposite side of the track. At the same time, the operator on trailing tower car 55 affixes hangers 57 between the catenary cable and the contact wire of attached overhead line 4 in a trailing operation immediately following the attachment operation to maintain catenary cable 3 and contact wire 2 at the desired vertical position. Tower car 55 may advance continuously behind boom car 1 while work platform 56 is longitudinally displaced along suitable guide rails in a direction opposite to the operating direction indicated by arrow 14 so that the work platform will stand temporarily still when the operator attaches a hanger.

The lateral pivoting of crane 22, which causes pulleys 18, 19 to impart a zig-zag path to the tensioned catenary and contact wire supported and guided thereby, automatically tilts cradles 23, 24 as well as storage drums 33, 34 and winches 35, 36 mounted thereon about axis 39 extending in the direction of the longitudinal extension of machine frame 10 (see FIGS. 3 and 4). This automatic tilting is the result of the tensile force of the laterally moved catenary and contact wire but, if desired, this pull may be reinforced by suitable tilting drives. Any excess tilting is prevented by resilient abutments or shock absorbers 77, 78 (FIG. 4) which limit the pivoting stroke of the cradles. This tilting of the storage drums and winches in response to the lateral movement of the support and guide pulleys on laterally pivoting crane 22 assures a troublefree unreeling of the catenary and contact wire and winding thereof under tension about winches 35, 36. Any slippage of the catenary and the contact wire is dependably avoided because they are wound several times about guide rollers 41, 64 of the winches while they are maintained constantly under the required tension. Lateral displacement drives 67 laterally displace storage drums 33, 34 correspondingly to the laterally adjacent windings so that the unreeled portions of the catenary and contact wire always are in a vertical plane extending perpendicularly to rotary axes 65 of the guide rollers of the winches.

This operation is repeated as the overhead line is guided in a zig-zag path and catenary 3 is attached to the laterally inwardly projecting steady braces 53 on succeeding pylons 52 at opposite sides of track 7, the width of the zig-zag path between the steady braces being usually about 80 cm. Vertical measuring and indicating instrument 61 on lifting device 20 enables the level of boom 17 to be remote-controlled by operator 51 who can actuate drive 15 so that the catenary and the contact wire will remain constantly at desired levels a and b. For example, if a tunnel along the track requires a lowering of level a of catenary 3, the crane is correspondingly lowered while drive 32 is simultaneously actuated to raise support and guide pulley 19 (see phantom line in FIG. 1) so that contact wire 2 remains at desired level b.

When the last pylon 52 of the track section over which overhead line 4 has been installed is reached, it is affixed thereto and connected to weights in a known manner after the attachment has been loosened so that the required tension is permanently maintained. The installation over the succeeding track section can then be effectuated in the above-identified manner.

The apparatus schematically illustrated in FIG. 8 comprises two like self-propelled machines 106, 107 of the same structure as described and illustrated in connection with FIGS. 1 to 5 for respectively continuously laying and receiving overhead line 104, 105 respectively comprised of catenary 114, 115 and contact wire 116, 117. The overhead lines are attached to pylons 118. The machines are moved along the track in an operating direction indicated by arrow 108 and adjacent machine frame ends are spaced from each other in this direction. The machines are mirror-symmetrically arranged in this direction and work car 109, 110 is coupled to each self-propelled machine 106, 107, each work car comprising power-driven, vertically adjustable and longitudinally displaceable work platform 112, 113.

In use, leading machine 107 is operated to dismount old overhead line 105 by supporting and guiding its catenary and contact wire on pulleys and reeling them under tension on storage drums in a manner proceeding reversely to the unreeling operation described hereinabove, operating personnel on work platform 113 detaching catenary 115 from its steady braces on the pylons and removing the hangers. Trailing machine 106 is operated to install new overhead line 106 in the above-described manner, operating personnel on work platform 112 attaching catenary 114 to its steady braces on pylons 118 and attaching the hangers.

What is claimed is:

1. A self-propelled machine for continuously laying and immediately fixing at least one of two elongated flexible elements of an overhead line extending above a track exclusively between successively pylons spaced alongside the track, one of the two elongated flexible elements being a catenary cable and the other elongated flexible element being a contact wire, which comprises
   (a) a machine frame having two opposite ends,
   (b) undercarriages supporting the machine frame at the ends thereof for mobility on the track,
   (c) a drive for moving the machine frame along the track in an operating direction,
   (d) a driving operator's cab mounted on the machine frame,
   (e) a power-driven, vertically and laterally adjustable work platform mounted on the machine frame for an operator assigned to attaching the overhead line to the pylons,
   (f) a storage drum mounted on the machine frame, a length of the elongated flexible element being reeled on the storage drum and the drum being rotatable at a pay-out speed for unreeling the elongated flexible element,
   (g) a drive control for adjusting the moving speed of the machine frame in response to the payout speed of the elongated flexible element,
   (h) a lifting device mounted on the machine frame, the lifting device including
   (1) a power-driven, vertically adjustable and laterally pivotal boom and
   (2) a power-driven support and guide pulley carried by the boom for pivoting about a substantial vertical axis and arranged to support and guide the unreeled elongated flexible element from the storage drum to the operator on the work platform at a constant height determined by the vertical adjustment of the boom and a lateral position determined by the pivoting of the boom, and
   (i) a device mounted on the machine frame between the storage drum and the pulley having means for continuously guiding and tensioning the elongated flexible element along a lateral zig-zag path exclusively between successive pylons so that the element is automatically tensioned and, in cooperation with said lifting device, automatically centered and oriented in the longitudinal direction of the element when the element extends in a lateral zig-zag path between successive ones of the pylons at respective sides of the track, the guiding and tensioning device including
   (1) a power-driven guide roller guiding the tensioned elongated flexible element to the support and guide pulley, and
   (2) a drive control for the guide roller.

2. The self-propelled machine of claim 1, wherein the support and guide pulley as well as the guide roller are arranged for guiding the elongated flexible element along a path extending substantially perpendicularly to the rotary axes of the pulley and roller independently of the lateral position of the boom.

3. The self-propelled machine of claim 2, wherein the guide roller is positioned below the support and guide pulley and is mounted on the machine frame for tilting about an axis extending in the longitudinal extension of the machine frame and perpendicularly to the rotary axis of the roller.

4. The self-propelled machine of claim 1, wherein the support and guide pulley as well as the guide roller have circumferential guide grooves accommodating the elongated flexible element, and the pulley and roller are so positioned relative to each other that the element will be deflected by at least 90° as it is guided from the roller to the pulley.

5. The self-propelled machine of claim 4, wherein the elongated flexible element is a relatively stiff contact wire, and the pulley and roller have substantially the same diameter of at least about one meter.

6. The self-propelled machine of claim 1, further comprising a carrier member for supporting the support and guide pulley rotatably about a transverse axis, the carrier member being supported on the boom for pivoting about a substantially vertical axis whereby the elongated flexible element is automatically centered and oriented in a desired longitudinal direction of the element.

7. The self-propelled machine of claim 6, further comprising a holder mounting the support and guide pulley on an outer end of the carrier member remote from the vertical pivoting axis, the holder being rotatable about an axis extending perpendicularly to the vertical axis substantially parallel to the longitudinal direction of the elongated flexible element whereby the support and guide pulley is universally pivotal.

8. A self-propelled machine for continuously laying at least one of two elongated flexible elements of an overhead line extending above a track and attached to pylons spaced alongside the track, one of the two elongated flexible elements being a catenary cable and the other elongated flexible element being a contact wire, which comprises
   (a) a machine frame having two opposite ends,
   (b) undercarriages supporting the machine frame at the ends thereof for mobility on the track,
   (c) a drive for moving the machine frame along the track in an operating direction,
   (d) a driving operator's cab mounted on the machine frame,
   (e) a power-driven, vertically and laterally adjustable work platform mounted on the machine frame for an operator assigned to attaching the overhead line to the pylons,
   (f) a storage drum mounted on the machine frame, a length of the elongated flexible element being reeled on the storage drum and the drum being rotatable at a pay-out speed for unreeling the elongated flexible element,
   (g) a drive control for adjusting the moving speed of the machine frame in response to the pay-out speed of the elongated flexible element,
   (h) a lifting device mounted on the machine frame, the lifting device including
   (1) a power-driven, vertically adjustable and laterally pivotal boom and
   (2) a support and guide pulley carried by the boom and arranged to support and guide the unreeled elongated flexible element from the storage drum to the operator on the work platform at a constant height determined by the vertical adjustment of the boom and a lateral position determined by the pivoting of the boom,
   (i) a device mounted on the machine frame between the storage drum and the pulley for continuously guiding and tensioning the elongated flexible element, the guiding and tensioning device including
  (1) a power-driven guide roller guiding the tensioned elongated flexible element to the support and guide pulley, and another guide roller connected with the power-driven guide roller for rotation in tandem therewith, the guide rollers being rotatable about transverse axes extending parallel to each other and being tiltable about an axis extending in the longitudinal extension of the machine frame and perpendicularly to the rotary axes of the rollers, the tandem guide rollers forming a winch about which the elongated flexible element may be wound several times for obtaining a desired element tensioning rotary moment and
  (2) a drive control for the guide roller, and
(j) a common cradle for the storage drum and the elongated flexible element tensioning winch, the storage drum being mounted on the cradle for transverse displacement parallel to the rotary axes of the guide rollers, and the cradle being mounted on the machine frame for tilting about the longitudinally extending axis.

9. The self-propelled machine of claim 8, comprising two of said pulleys mounted on the boom for pivoting about a common vertical axis and two of said cradles mounted on the machine frame in succession, each cradle carrying a respective one of the storage drums for the catenary cable and the contact wire, respectively, and a respective one of the guiding and tensioning devices between the respective storage drum and the respective pulley for continuously guiding and tensioning the catenary cable and the contact wire, the respective pulleys supporting and guiding the catenary cable and the contact wire unreeled from the respective storage drums to the operator on the work platform at respective constant heights respectively determined by the vertical adjustment of the boom and of the vertical distance of the pulleys from each other as well as a lateral position determined by the pivoting of the boom.

10. The self-propelled machine of claim 8, further comprising a common carrier member supporting the support and guide pulleys rotatably about transverse axes extending parallel to each other, the carrier member being supported on the boom for pivoting about the common vertical axis, and a respective holder mounting each support and guide pulley on an outer end of the carrier member remote from the vertical pivoting axis, the holders being rotatable about axes extending perpendicularly to the vertical axis substantially parallel to a plane defined by the contact wire and catenary cable whereby the support and guide pulleys are universally pivotal and automatically centered and oriented in a desired longitudinal direction of the contact wire and catenary cable.

11. The self-propelled machine of claim 10, further comprising a power drive linking the holder for the support and guide pulley for the contact wire to the carrier member for adjusting the vertical distance between the contact wire support and guide pulley and the catenary cable support and guide pulley.

12. The self-propelled machine of claim 9, wherein the contact wire support and guide pulley trails the catenary cable support and guide pulley in the operating direction.

13. The self-propelled machine of claim 9, wherein each cradle comprises a first frame part defining an opening accommodating the respective storage drum and a adjoining frame part whereon the guiding and tensioning device is mounted, the two cradles being mounted on the machine frame in succession in the longitudinal extension thereof.

14. The self-propelled machine of claim 13, further comprising reserve storage drums for the catenary cable and the contact wire, respectively, mounted on the machine frame between the cradles.

15. The self-propelled machine of claim 9, wherein the lifting device is a crane, the boom thereof being a telescopingly arranged arm extending in the direction of the longitudinal extension of the machine frame, and further comprising a power drive linking the boom to the crane for vertically adjusting the boom and a power drive for telescopingly adjusting the boom arm, the crane being mounted on the machine frame ahead of the cradles in the operating direction and the power drives enabling the support and guide pulleys on the boom to be adjustably positioned above a space centered between the two cradles.

16. The self-propelled machine of claim 8, further comprising abutments at both sides of the cradle for limiting the tilting thereof.

17. The self-propelled machine of claim 8, further comprising a power drive for rotating the storage drum to unreel the elongated flexible element.

18. The self-propelled machine of claim 8, further comprising a power drive for the transverse displacement of the storage drum on the cradle.

19. The self-propelled machine of claim 1, further comprising a tension monitoring instrument arranged between the guiding and tensioning device and the support and guide pulley in contact with the unreeled elongated flexible element for measurably determining and maintaining a selected constant tension thereof, and a central control on the work platform, the tensioning monitoring instrument being connected to the central control and to the drive control of the guide roller.

20. The self-propelled machine of claim 19, wherein the tension monitoring instrument has an odometer incorporated therein.

21. The self-propelled machine of claim 1, wherein the driving operator's cab is mounted on the machine frame at a leading one of the machine frame ends in the operating direction, the lifting device is mounted on the machine frame immediately behind said cab in the operating direction and the work platform is mounted on the machine frame at the opposite, trailing machine frame end.

22. The self-propelled machine of claim 18, wherein the opposite machine frame end has a material storage space adjacent the work platform.

23. The self-propelled machine of claim 1, wherein the lifting device comprises a vertical measuring and indicating instrument.

24. The self-propelled machine of claim 1, further comprising power drives for vertically and laterally adjusting the work platform, for vertically and laterally adjusting the lifting device, and for longitudinally adjusting the boom to position the support and guide pulley with respect to the guide roller, and a central control on the work platform connected to the power drives for remote control thereof, the central control including a digital indicator instrument for indicating the tension of the unreeled elongated flexible element.

25. The self-propelled machine of claim 1, in combination with a trailing, self-propelled tower car carrying a vertically adjustable work tower for an operator assigned to detach and attach hangers connecting the contact wire to the catenary cable and steady braces attaching the overhead line to the pylons.

26. An apparatus for continuously reconstructing an overhead line comprised of two elongated flexible elements extending above a track exclusively between successive pylons spaced alongside the track, one of the two elongated flexible elements being a catenary cable and the other elongated flexible element being a contact wire, which comprises
   (a) two like self-propelled machines for respectively continuously laying and receiving the overhead line, each machine comprising
      (1) a machine frame having two opposite ends,
      (2) undercarriages supporting the machine frame at the ends thereof for mobility on the track,
      (3) a drive for moving the machine frame along the track in an operating direction, adjacent ones of the machine frame ends of the machines being spaced from each other in said direction and the machine being mirror-symmetrically arranged in said direction,
      (4) a driving operator's cab mounted on the machine frame,
      (5) a power-driven, vertically and laterally adjustable work platform mounted on the machine frame for an operator assigned to attaching the overhead line to the pylons,
      (6) a storage drum mounted on the machine frame, a length of the elongated flexible element being reeled on the storage drum and the drum being rotatable at a pay-out speed for unreeling the elongated flexible element,
      (7) a drive control for adjusting the moving speed of the machine frame in response to the pay-out speed of the elongated flexible element,
      (8) a lifting device mounted on the machine frame, the lifting device including a power-driven, vertically adjustable and laterally pivotal boom, and a power-driven support and guide pulley carried by the boom for pivoting about a substantial vertical axis and arranged to support and guide the unreeled elongated flexible element from the storage drum to the operator on the work platform at a constant height determined by the vertical adjustment of the boom and a lateral position determined by the pivoting of the boom, and
      (9) a device mounted on the machine frame between the storage drum and the pulley having means for continuously guiding and tensioning the elongated flexible element along a lateral zig-zag path exclusively between successive pylons so that the element is automatically tensioned and, in cooperation with said lifting device, automatically centered and oriented in the longitudinal direction of the element when the element extends in a lateral zig-zag path between successive ones of the pylons at respective sides of the track, the guiding and tensioning device including a power-driven guide roller guiding the tensioned elongated flexible element to the support and guide pulley, and a drive control for the guide roller, and
   (b) a work car coupled to each self-propelled machine, each work car comprising
      (1) a power-driven, vertically adjustable and longitudinally displaceable work platform.

* * * * *